Nov. 15, 1966    A. PERROT    3,284,939
MOUNTING FOR RECEIVING OBJECTS TO BE FRAMED
Filed July 7, 1964    2 Sheets-Sheet 1
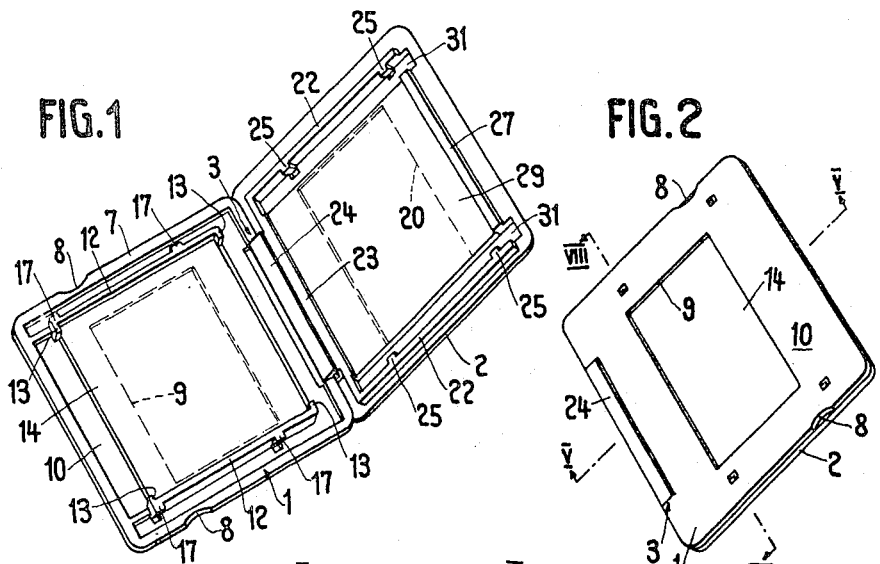
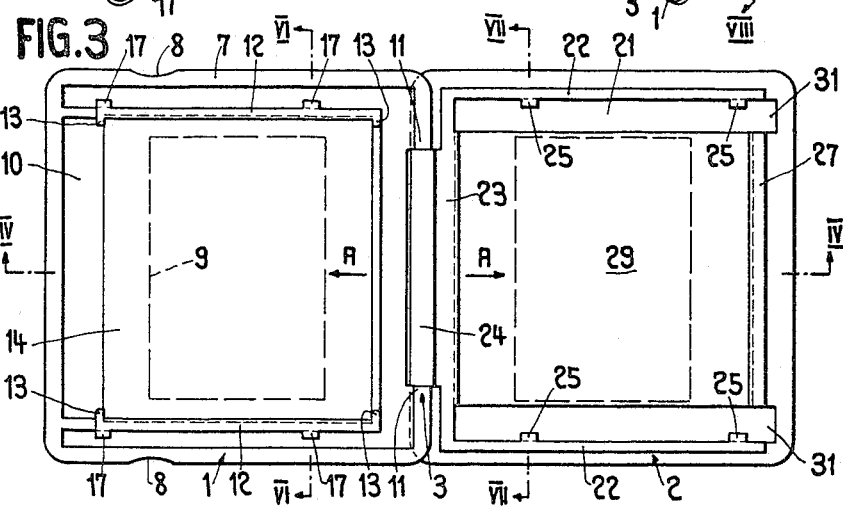
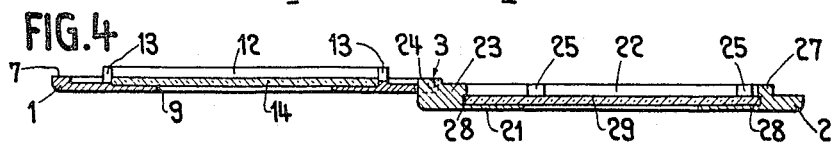
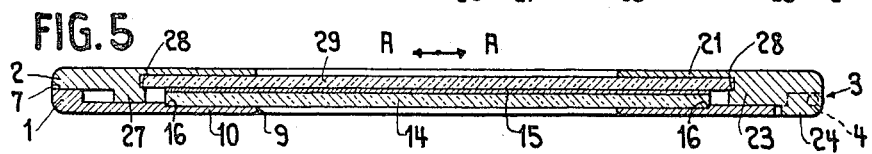
INVENTOR
Arnold Perrot
BY
ATTORNEY

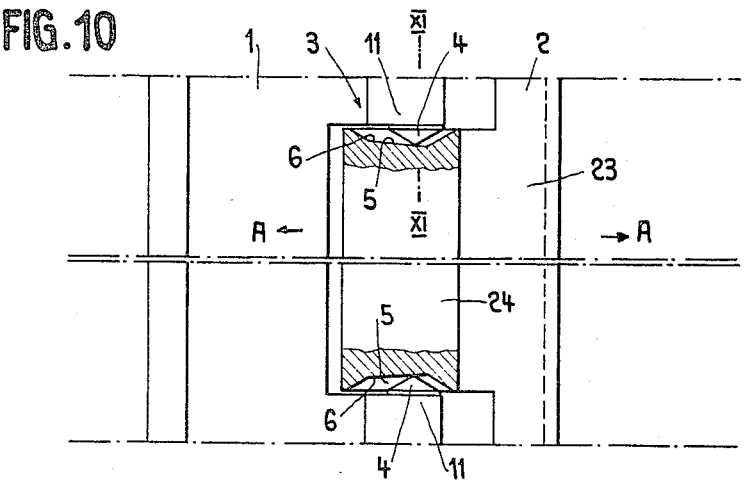

United States Patent Office 3,284,939
Patented Nov. 15, 1966

3,284,939
MOUNTING FOR RECEIVING OBJECTS
TO BE FRAMED
Arnold Perrot, Martiweg 4, Nidau, near Biel, Switzerland
Filed July 7, 1964, Ser. No. 380,772
Claims priority, application Switzerland, July 12, 1963,
8,723/63
4 Claims. (Cl. 40—152)

Object of the invention is a mounting for receiving objects to be framed, such as, for instance, transparencies.

Another object of the invention is a collapsible two-part mounting for receiving objects to be framed, such as, for instance, transparencies, in which two mounting parts are hinged together.

In prior collapsible two-part mountings the mounting parts are locked with each other in that, on moving the one part down onto the other, the one-half of a snap device on the one mounting part engages the other half of the snap locking device provided on the other mounting part. The articulation between the two mounting parts is obtained by an ordinary hinge joint. Since the snap device is disposed on the side remote from and parallel to the hinge axis, a dustproof closure is obtained to some extent only on the side of the snap device. Since the two sides of the relatively thin mounting parts, perpendicular to the hinge axis are reliably pressed together only at their ends by means of the hinge and the snap device, dust may easily enter between these ends into the interior of the mounting. Also the side near to the hinge is not dustproof. Moreover, the nonuniform pressure onto the film causes optical disturbances.

It has already been tried to remedy this inconvenience by making the one mounting part shiftable in the mounting plane with regard to the other mounting part. In this way, one succeeded in arranging bayonet locks in such a manner that the pressure between the two mounting parts onto the film was uniform enough to avoid entrance of dust and optical disturbances. These prior mountings, however, have the disadvantage that their two parts are not hinged together; on opening the mounting, these parts are completely separated from each other. Therefore, for closing the mounting, the user must at first bring the parts in correct relative position above one another.

It is a further object of the invention to combine the advantages of the two above-mentioned prior kinds of mountings while avoiding their inconveniences. For that purpose it is another object of the invention to provide for a hinge connection between the two mounting parts which allows of a displacement of these parts relatively to each other in the mounting plane and across the hinge axis for the purpose of locking and unlocking the mounting parts in their collapsed position with and from each other.

A still other object of the invention is to provide, in spite of the permanent connection between the two mounting parts, bayonet locks guaranteeing reliable tightness against dust and uniform holding of the film or other transparency all over the circumference of the mounting.

Other objects and features will be apparent from the following description of one example of performance of my invention in the shape of a mounting for transparencies, reference being had to the accompanying drawings in which:

FIG. 1 is a perspective view in about full size of this embodiment in open condition, and FIG. 2 is a perspective view of the mounting in closed condition;

FIG. 3 is, on a larger scale, a plan view of the opened mounting;

FIG. 4 is a sectional view along the line IV—IV of FIG. 3;

FIG. 5 is, on a larger scale, a sectional view along the line V—V of FIG. 2;

FIG. 6 is a sectional view along the line VI—VI of FIG. 3;

FIG. 7 is a sectional view along the line VII—VII of FIG. 3;

FIG. 8 is, on a larger scale, a sectional view along the line VIII—VIII of FIG. 2;

FIG. 9 is a sectional view along the line IX—IX of FIG. 8;

FIG. 10 is, on a considerably enlarged scale, a partially sectional plan view of the hinge, and FIG. 11 is a sectional view along the line XI—XI of FIG. 10.

The two mounting parts 1 and 2, which may be made from plastics, are articulated to each other by means of a hinge 3 so that they can be swung about the axis of the hinge either to approach them to or to move them away from each other. As shown in FIGS. 10 and 11, the hinge 3 is of special construction. Pins 4 of the mounting part 1 form the joint axis and engage oblong bearing pans 5 of the mounting part 2. Due to the oblong bearing pans 5 the mounting parts 1 and 2 can be shifted relatively to each other in the direction of the arrows A (FIGS. 3, 5 and 10), that is, across (perpendicularly) to the articulation axis of the hinge 3 even if they are, as shown in FIGS. 5 and 9, turned down onto each other. Referring to FIG. 10, the two bearing pans 5 have a bottom 6 ascending from the right to the left end, i.e., a bottom inclined with regard to the articulation axis of the hinge. The purpose of this inclination of the bottoms 6 will be described later on.

The mounting part 1 has an outer rim 7 with recesses 8 for easing the grasping by the fingers when the mounting is to be opened. Along three sides a rim 7 surrounds a mask 10 provided with a window 9 of the mounting part 1. On the fourth side the rim 7 is open and carries the pins 4 of the hinge 3 on its ends opposite to each other. Inside the rim 7 and on two sides opposite to each other the mounting part 1 has ribs 12 with their ends 13 bent at a right angle to form a corner, and with a shoulder 19 under which a protective glass 14 is engaged. The ribs 12 do not only serve for holding the glass 14 in the direction perpendicular to the plane of the mounting but, together with their ends, also for holding the protective glass 14 and the inserted transparency film 15 towards all directions of the mounting plane. Moreover, the protective glass 14 lies in a slight recess 16 of the mask 10. On their outer edge, the ribs 12 have two bayonet cams 17 each with an inclined working surface 18 (FIGS. 6 and 8). When the protective glass 14 is to be removed, a slight bending of the thin mounting part 1 along a line between and parallel to the ribs 12 will be sufficient to have the protective glass 18 jump out of the shoulders 19. For inserting the protective glass 14 a slight pressure onto the mounting part 1 in reach of the ribs suffices due to its elastic yieldingness to have the glass 14 jump into the shoulders 19.

The mounting part 2 has a rim consisting of ribs 22 and 23 and surrounding on three sides a mask 21 provided with a window 20 equal to the window 9. Along a portion of its length the rib 23 has a slightly elevated widening 24 at the ends of which the bearing pans 5 are provided. On their inner edges the ribs 22 have bayonet cams 25 with sloped working surfaces 26 provided to cooperate with the working surfaces 18 of the bayonet canes 17 of the part 1 for interlocking the parts 1 and 2 in the closed condition of the mounting. Opposite to the rib 23 is a rib 27 separated from the ribs 22.

The ribs 23 and 27 have shoulders 28 under which a protective glass 29 is engaged which, besides, lies in a recess 30 of the mask 21. Therefore, the protective glass 29 is secured both in the direction perpendicular to the mounting plane and towards all directions in the mounting plane. For inserting and removing the protective glass 29 the same manipulations are made as described above with regard to the protective glass 14. The longitudinal direction of the protective glass 29 crosses the longitudinal direction of the protective glass 14. In the closed condition of the mounting, the rib corners 13 remote from the hinge 3 lie in the spaces 31 left beween the ribs 22 and the rib 27. Therefore, on the mounting being in closed condition, the ribs 23, 12 and 27 form together a compartment closed all over its circumference. Therefore, it is not necessary that each of the mounting parts 1 and 2 has for itself such a closed compartment. That is possible due to the crosswise arrangement of the two protective glasses 14 and 29 and, besides an easier manufacture, offers the advantage of an easy insertion and removal of the protective glasses. The depth of the above-mentioned compartment plus the depth of the two recesses 16 and 30 of the masks 10 and 21 is equal or slightly larger than the sum of the thicknesses of the two protective glasses 14 and 29 and the transparent positive film 15.

Assuming that the mounting is in the open condition (FIGS. 1, 3 and 4) so that the parts 4 and 5 of the hinge 3 are in the position relative to each other as shown in FIG. 10. The film 15 is brought in the mounting part 1 onto the protective glass 14 in such a manner, that it is held by the ribs 12 and their corners 13 towards all directions of the mounting plane. Afterwards while maintaining the position illustrated in FIG. 10 of the hinge parts 4 relative to the hinge parts 5, the mounting part 2 is swung until it arrives in the position according to FIG. 9 where it lies on the mounting part 1. In this relative position between the parts 1 and 2 the bayonet cams 25 of the part 2 lie still by the side of the bayonet cams 17 of the part 1. When the part 2 is now shifted in the mounting plane relatively to the part 1 out of the position of FIG. 9 towards the left, the two parts 1 and 2 are brought into the relative position to each other according to FIG. 5 and the working surfaces 18 of the bayonet cams 17 are in engagement with the working surfaces 26 of the bayonet cams 25 whereby the closed mounting is locked. On the above-mentioned shifting of the part 2 relatively to the part 1 from the position according to FIG. 9 into that according to FIG. 5 the position of the pins 4 with regard to the bearing pans 5 has changed from that shown in FIG. 10 whereby the pins 4 have run along the inclined bottoms 6 of the pans 5. Thereby, the relative position of the now interlocked parts 1 and 2 is also secured in the direction of the hinge axis.

If the closed mounting is to be unlocked and opened, the reverse proceeding is executed, i.e., the parts 1 and 2 are displaced in the mounting plane out of their relative position according to FIG. 5 into their relative position according to FIG. 9 and, afterwards, the mounting is opened while the hinge parts 4 and 5 are in their relative position according to FIG. 10.

The advantages of the mounting according to the invention are manifest. Not only remain the mounting parts 1 and 2 in every one of their relative positions connected with each other by means of the hinge 3, but this hinge also allows the parts 1 and 2 in the collapsed condition of the mounting to be shifted relatively to each other and, due to the bayonet connections, to produce a uniformly distributed pressure onto the films and the surfaces contacting each other of the parts 1 and 2. Optical disturbances caused by nonuniform pressure onto the film are avoided and the compartment closed all over its circumference is reliably tightened against dust due to the uniform pressure.

The pins 4 engaging the pans 5 may, for instance, be replaced by an axle or axles on the one mounting part, said axle or axles traversing oblong holes of the other mounting part.

While I have illustrated and described one embodiment of my invention I do not wish to restrict the protection thereto but to reserve the right to make such modifications and rearrangements of the several parts as may come in purview of the appending claims.

I claim:
1. In a collapsible, hinged two-part mounting for receiving flat objects to be framed, a first mounting part comprising hinge-pins, a second mounting part comprising hinge-bearing pans supporting said hinge-pins, said hinge-bearing pans being oblong in a direction across the hinge-axis of said hinge-pins to allow movement of said mounting parts relatively to each other in the mounting plane in their collapsed position.

2. In a collapsible, hinged two-part mounting as claimed in claim 1, the bottom of said hinge-bearing pans being inclined relatively to said hinge-axis to secure the position of said mounting parts relatively to each other in the direction of said hinge-axis.

3. In a collapsible, hinged two-part mounting as claimed in claim 1, a protecting glass received in said first mounting part, another protecting glass received in said second mounting part and lying crosswise to the protecting glass of said first mounting part.

4. In a collapsible, hinged two-part mounting for receiving flat objects to be framed, a first mounting part comprising hinge-pivot means, a second mounting part comprising hinge-bearing means receiving said hinge-pivot means, said hinge-bearing means being oblong in a direction across the hinge-axis of said hinge-pivot means to allow movement of said mounting parts relatively to each other in the mounting plane in collapsed position in two opposite directions across the hinge-axis, bayonet means on said first mounting part, bayonet means on said second mounting part adapted to be engaged with or disengaged from the bayonet means on said first mounting part upon the two mounting parts being moved relatively to each other in the mounting plane in the one or in the opposite direction across the hinge-axis while in collapsed position.

References Cited by the Examiner

UNITED STATES PATENTS 2,968,884   1/1961   Anastasio _____ 40—152
3,200,527   8/1965   Clark _____ 40—152

FOREIGN PATENTS 1,046,909   12/1958   Germany.

EUGENE R. CAPOZIO, *Primary Examiner.*

W. J. CONTRERAS, *Assistant Examiner.*